United States Patent
Kraemer et al.

(10) Patent No.: US 8,625,418 B2
(45) Date of Patent: Jan. 7, 2014

(54) SYSTEM AND METHOD FOR IMPROVING SERVICE AND DEVICE DISCOVERY IN A UPNP-BASED WIRELESS COMMUNICATION NETWORK

(75) Inventors: Oliver Kraemer, Ostfildern (DE); Shin Saito, Stuttgart (DE)

(73) Assignee: Sony Deutschland GmbH, Berlin (DE)

( * ) Notice: Subject to any disclaimer, the term of this patent is extended or adjusted under 35 U.S.C. 154(b) by 852 days.

(21) Appl. No.: 12/096,621

(22) PCT Filed: Nov. 24, 2006

(86) PCT No.: PCT/EP2006/011306
§ 371 (c)(1),
(2), (4) Date: Jun. 9, 2008

(87) PCT Pub. No.: WO2007/073814
PCT Pub. Date: Jul. 5, 2007

(65) Prior Publication Data
US 2008/0304408 A1 Dec. 11, 2008

(30) Foreign Application Priority Data
Dec. 23, 2005 (EP) .................................... 05028274

(51) Int. Cl.
*G01R 31/08* (2006.01)
*G06F 11/00* (2006.01)
(52) U.S. Cl.
USPC ........................................................ 370/230
(58) Field of Classification Search
USPC .................................. 370/230, 432, 254, 389
See application file for complete search history.

(56) References Cited

U.S. PATENT DOCUMENTS 7,627,690 B2 * 12/2009 Kobayashi ..................... 709/238
2005/0185658 A1 * 8/2005 Kamiwada et al. ........... 370/401

(Continued)

FOREIGN PATENT DOCUMENTS

| EP | 1 594 278 | | 11/2005 |
| JP | 2007049382 A | * | 2/2007 |
| WO | 2005 076567 | | 8/2005 |

OTHER PUBLICATIONS

Goland, Yaron Y. et al., "Simple Service Discovery Protocol / 1.0 operating without an Arbiter <draft-cai-ssdp-v1-03.txt>", Internet Engineering Task Force, Internet Draft, No. 3, pp. 1-18, XP015011315, (1999).

*Primary Examiner* — Mark Rinehart
*Assistant Examiner* — Maharishi Khirodhar
(74) *Attorney, Agent, or Firm* — Oblon, Spivak, McClelland, Maier & Neustadt, L.L.P.

(57) ABSTRACT

A system and method that improve service and device discovery in a UPnP-based wireless communication network and avoids unnecessary broadcast messages on a MAC sub-layer of a DLC layer caused by UPnP multicast messages on an IP layer by intercepting UPnP multicast messages in a network protocol stack below the IP layer. A module intercepts multicast UDP packets destined to a UPnP IP multicast address and port, the multicast UDP packets containing UPnP packets as payload. The module executes DLC/MAC-based service discovery functions to perform wireless network-specific device discovery and to find UPnP-enabled devices in the wireless communication network. Once a wireless network device discovery has returned nodes that fulfill criteria given in the search, the module uses unicast DLC/MAC messages to send UPnP packets to only those nodes that are UPnP-enabled and whose device type matches the respective UPnP device type sought.

11 Claims, 10 Drawing Sheets

(56) References Cited

U.S. PATENT DOCUMENTS

| | | |
|---|---|---|
| 2006/0002320 A1* | 1/2006 | Costa-Requena et al. .... 370/312 |
| 2007/0004436 A1* | 1/2007 | Stirbu ........................... 455/503 |
| 2007/0115973 A1* | 5/2007 | Koga et al. .................... 370/389 |
| 2007/0127394 A1* | 6/2007 | Stirbu et al. ................... 370/254 |
| 2008/0137682 A1* | 6/2008 | Kish et al. ..................... 370/432 |

* cited by examiner

SYSTEM AND METHOD FOR IMPROVING SERVICE AND DEVICE DISCOVERY IN A UPNP-BASED WIRELESS COMMUNICATION NETWORK

FIELD AND BACKGROUND OF THE INVENTION

The present invention generally relates to the field of service and device discovery in a wireless communication network which does not provide multicast support on the medium access control (MAC) sublayer of the data link control (DLC) layer. It particularly refers to a new system and a corresponding method for improving service and device discovery in a wireless communication network using a protocol based on the Universal Plug and Play (UPnP) standard that runs on top of a TCP/IP-based networking layer.

Universal Plug and Play (UPnP) is a distributed, open networking architecture that offers pervasive peer-to-peer network connectivity of personal computers, intelligent appliances and wireless devices. The UPnP networking architecture specification defines general interoperability mechanisms including, among others, mechanisms for automatic address configuration and mechanisms for service and device discovery which enable self-configuring devices to create an ad-hoc, self-discovering communication system of interoperable network devices. This architecture thus leverages TCP/IP-based communication networks to enable seamless proximity networking in addition to control and data transfer among networked devices, which is particularly advantageous in home and office network environments. UPnP achieves this by defining and publishing a set of UPnP device control protocols which allow networked TCP/IP devices to communicate with each other so as to announce their presence to all other devices on a UPnP-based communication network and to then interoperate in a flexible and predefined fashion. Said UPnP device control protocols are built on open, Internet-based communication standards such as TCP/IP, UDP, HTTP, SSDP, SOAP, GENA and XML, which provide the communication infrastructure for said UPnP networking architecture, and allow networked TCP/IP devices to communicate with each other so as to announce their presence to all other devices on the communication network and then to interoperate in a flexible and predefined fashion. Thereby, UPnP technology can run on any physical medium including e.g. phone lines, power lines (PLC), Ethernet, IR (IrDA), RF (Wi-Fi, Bluetooth) and FireWire. Due to the fact that common base protocols are used on a per-device basis, no extra device drivers are required.

A UPnP networking architecture supports zero-configuration, invisible networking and automatic discovery for a breadth of device categories from a wide range of vendors, whereby a device can dynamically join a network, obtain an IP address, announce its name, convey its capabilities upon request and learn about the presence and the capabilities of other devices. DHCP (Dynamic Host Configuration Protocol) and DNS (Domain Name System) servers are optional and are only used if they are available on the network. However, each device must have a DHCP client and search for a DHCP server when the device is first connected to the network. If no DHCP server is available, the device has to assign an address by itself. In case the device obtains a domain name during the DHCP transaction, e.g. through a DNS server or via DNS forwarding, said device should use this name in subsequent network operations; otherwise, the device should use its IP address.

Although a UPnP networking architecture typically consists of a peer-to-peer network, nodes on the network communicate with each other in a client/server-based manner. Thereby, client terminals that provide a user interface for end users are called "Control Points" (CP), and servers providing a well-defined set of services, each of which corresponding to a functional component of a particular server, are called "Controlled Devices" (CD). When a specific CD is added to the network, the UPnP discovery protocol allows that device to advertise its specific services to the CPs on said network. Similarly, when a CP is added to the network, the UPnP discovery protocol allows that CP to search for CDs of interest on the network. The fundamental message exchange in both cases is a discovery message broadcasted by means of the Simple Device Discovery Protocol (SDDP), that contains a few, essential specifics about said CD, a specific one of its services, e.g. its device type, identifier and a pointer to more detailed information, or functional capabilities a CP wants to control. Thereby, any CD which exposes these device capabilities responds to a specific CP's discovery request by identifying itself to the respective CP. This response contains the URL of an XML device description document which identifies specific services implemented by the CD as well as specific actions and state variables that are supported by each service. By parsing this information, the CP is able to determine the exact capabilities of each CD. This allows a CP to determine if it wants to interact with and control a particular CD. When a new CD is added to the network, it may broadcast an identification notification to the network which informs existing CPs about the fact that a new CD has been added to the network and is available to be controlled. The notification information thereby includes the URL of the new CD's description document.

After a CD has been discovered by a CP, the CP still knows very little about this device. For the CP to learn more about the respective device and its device capabilities or to interact with the CD, said CP has to retrieve said CD's description from the URL provided by the CD in the discovery message. The UPnP description for a CD is usually expressed in XML and includes vendor-specific manufacturer information such as the model name and number, serial number, manufacturer name, URLs to vendor-specific web sites, etc. The description also includes a list of any embedded devices or services as well as URLs for control, eventing, and presentation. For each service, the description includes a list of the commands or actions to which the service responds and parameters or arguments for each action. The description for a service further includes a list of variables modeling the state of the service at run time which are described in terms of their data type, range and event characteristics.

After having retrieved a description of the respective CD, the CP is able to send actions to a particular service of this CD. For this purpose, the CP sends a suitable control message to the control URL for the service (provided in the device description). This control message is also expressed in XML using the Simple Object Access Protocol (SOAP). Like function calls, the service returns any action-specific values in response to the control message. The effects of the action, if any, are modeled by changes in the variables that describe the run-time state of the service.

A UPnP description for a service comprises a list of actions this service responds to and a list of variables modeling the state of said service at run time. When these variables change, updates are published by the service and a CP may subscribe to receive this information. The respective service then publishes updates by sending event messages containing the names of at least one state variable and the current value of said variable(s). These messages are also expressed in XML and formatted using the General Event Notification Architecture (GENA). A special initial event message is sent when a CP first subscribes. This event message contains the names and values for all "evented" variables and allows the subscriber to initialize its model of the state of the service. To support scenarios with multiple CPs, eventing is designed to keep all CPs equally informed about the effects of any action. Therefore, event messages are sent to all subscribers, subscribers receive event messages for all "evented" variables that have changed, and these event messages are sent no matter why a particular state variable has been changed (either in response to a requested action or owing to the fact that the state the service is modeling has been changed).

In case a CD has a URL for presentation, the CP can retrieve a page from this URL, load the page into a web browser and, depending on the capabilities of the page, allow a user to control the device and/or view its device status. The degree to which each of these tasks can be accomplished depends on the specific capabilities of the presentation page and device.

For further information on service and device discovery according to the UPnP standard, the interested reader is referred to the URL http://www.upnp.org.

BRIEF DESCRIPTION OF THE PRIOR ART

WO 2005/076567 A1 describes a method for arranging communication in a local area networking system comprising a first device, a second device and an intermediate node which can be used for arranging data transmission between said first and said second device. The second device is thereby arranged to multicast and/or broadcast messages to other devices in the system. The transmission of multicast and/or broadcast messages to the first device is prevented by interworking means. An advantage of the herein described method is that less processing power is required in the first device due to the fact that fewer messages are received. Thereby, the power consumption of constrained devices, which means portable devices such as handheld PDAs, mobile stations or music players which are typically not able to support IEEE 802.x communication technology but often deploy energy-saving short-range communication media, such as e.g. Bluetooth, can be reduced. For bandwidth-limited links the reduced bandwidth usage is also an advantage, and thus a faster link is available for other data transmission. As the transfer of multicast and/or broadcast messages is reduced, the response time of the local area networking system and the average signal propagation time are shorter. Furthermore, devices not receiving multicast messages can still support all functions of the system, e.g. full UPnP stack, to be available in case they are connected to the local area networking system such that multicast messages can be received. This makes it easier to reach full compatibility with the second device, e.g. for enabling connectivity in configurations where there is direct connection between the first and the second device. One further advantage of invention described in WO 2005/076567 A1 is that it is relatively easy to implement for various technologies, thereby enabling a reduction in the costs of the end product.

PROBLEMS TO BE SOLVED BY THE INVENTION

UPnP-based communication protocols were originally designed for service and device discovery in fixed (wired) communication networks. In such a network environment, IP multicast messages, which are used for service announcements and device discovery, are repeatedly sent up to three times as recommended by the UPnP standard in order to ensure that these IP multicast messages are correctly received at those devices for which they are destined. In a wireless network without any multicast support on the DLC layer (=layer 2) and its MAC sublayer said multicast messages are mapped to DLC/MAC broadcast messages. Even if multicast data transmission was supported on layer 2, on a conventional broadcast medium, such as e.g. a wired LAN, device discovery and service announcement messages incur a communication overhead. However, whereas in conventional high-speed wired communication networks a communication overhead caused by broadcast messages is negligible, in wireless communication networks this additional transmission of data may cause a network congestion due to a considerable communication overhead.

An example of a fixed (wired) network communication is depicted in FIG. 1. It consists of three UPnP-enabled devices 102a-c being connected via an Ethernet LAN 104. As Ethernet is a broadcast medium, these three nodes 102a-c are immediate one-hop neighbors of each other, thus being able to listen to the data transmission of all other nodes within said network.

For a wireless network with features as will be described further below, the UPnP protocol does not use network resources efficiently, which is due to the fact that multicast device searches and service announcements are applied, some of which being sent several times to ensure that they actually reach all interested nodes. As already mentioned above, these multicast messages on the IP layer are mapped to broadcast messages on the MAC sublayer of the DLC layer when the underlying wireless network does not support multicasting. Without modifications to a UPnP protocol stack (for which the source code may not be available), a more efficient use of the underlying network resources is required. For the wireless communication network as mentioned above, the following features are assumed:

The wireless communication network shall be able to provide routing functionality, packet forwarding as well as service and device discovery (among other services) in the MAC sublayer of the DLC layer (layer 2). For any higher-layer protocols such as e.g. the IP protocol, neighboring nodes therefore appear to be directly connected (i.e. one wireless hop away), though in reality they may be two or even more wireless hops away due to the routing functionality.

Furthermore, multicast routing is not supported by the DLC layer, which implies that IP multicast (and broadcast) messages need to be broadcasted throughout a wireless network in order to reach all possible destinations.

It shall further be assumed that advanced power-saving methods are employed which allow a network card comprising an independent protocol processor to continue operating while a host PC system is in sleep mode. Thereby, DLC control messages may be exchanged, but higher-layer (IP- or UPnP-based) communication is not possible because these higher-layer protocols are implemented on the host PC which is in sleep mode. The host PC may e.g. be woken up by a special DLC/MAC control message from another device within the network.

Finally, it shall be assumed that the MAC sublayer provides functions for efficient service and device discovery in the wireless network (independent of UPnP and less complex).

An example of such a wireless network is shown in FIG. 2. Node 2, in FIG. 2 also referred to by reference number 202b, lies within the ranges of nodes 1 and 3, in FIG. 2 also referred to by reference numbers 202a and 202c, respectively, whereas nodes 1 and 3 are not in range of each other. However, due to the above-mentioned feature of DLC/MAC packet forwarding, for the IP layer of node 1, node 3 is only one hop away and vice versa since node 2 forwards packets on layer 2.

These specific properties of conventional wireless communication networks lead to an inefficient use of network resources when the UPnP standard is employed for this network due to the above-mentioned broadcasts. In addition, since DLC layer broadcasts can not be used to wake up sleeping nodes, some nodes on the wireless network that support UPnP will not be found as they will not be woken up by device discovery broadcast messages.

OBJECT OF THE PRESENT INVENTION

In view of the above-described prior art, it is the object of the present invention to provide a more efficient use of available network resources which are deployed for supporting service and device discovery in a UPnP-based wireless communication network by avoiding unnecessary broadcasts on the MAC sublayer of the DLC layer (layer 2) that are caused by UPnP multicast messages on the IP layer (layer 3).

This object is achieved by the present invention as defined in the independent claims. Advantageous features of the invention are defined in the subordinate claims.

SUMMARY OF THE INVENTION

The present invention is basically dedicated to system and a corresponding method for improving service and device discovery in a UPnP-based wireless communication network that avoids unnecessary broadcast messages on the MAC sublayer of the DLC layer caused by UPnP multicast messages on the IP layer by intercepting UPnP multicast messages in the network protocol stack below the IP layer. Instead of using the standard protocol mechanisms of the protocol stack which would map IP multicast messages to broadcast messages, said proposed system and method according to the present invention provide an optimized solution for the above-described wireless network. Said system, in the following also referred to as "UPnP optimizer module", is a component that intercepts multicast UDP packets destined to a UPnP IP multicast address and port, said multicast UDP packets containing UPnP packets as payload. After that, the UPnP optimizer module utilizes DLC/MAC-based service discovery functions so as to perform a wireless network-specific device discovery (on the MAC sublayer) and to find UPnP-enabled devices in the wireless communication network. FIG. 3 gives an overview of the applied protocol stack, from which it becomes apparent that the proposed UPnP optimizer module according to the present invention is integrated within this protocol stack as a new sublayer 2a.

A profile mapping unit integrated within the UPnP optimizer module according to the present invention thereby allows a more fine-grained mapping. If for example UPnP media renderer devices are searched by a specific UPnP query, this UPnP device type is mapped to the respective wireless network device type of a wireless node comprising said UPnP optimizer module. This mapping is not required to be a one-to-one mapping since multiple UPnP device and service types can also be mapped to a closest-matching wireless network device type. Network devices that do not have UPnP functionality are ignored. This device discovery method has several benefits over conventional UPnP device discovery methods according to the prior art:

Since wireless network device discovery is performed on DLC/MAC layer, it is more efficient for wireless networks than conventional UPnP device discovery.

Sleeping nodes are also found as only the host system is in sleep mode, but the processor on the wireless network card still responds to DLC/MAC device searches if it matches the search for a device profile.

Once the wireless network device discovery has returned nodes that fulfill the criteria given in the search, the UPnP optimizer module uses unicast DLC/MAC messages to send said UPnP packets to only those nodes which are UPnP-enabled and whose device type matches the respective UPnP device type which is sought.

This reduces the total number of messages sent in a wireless network significantly, as only potential candidates which might match the UPnP query (according to the mapping from UPnP device types to wireless network device types) will receive the search messages.

Aside from the above-described UPnP-based communication scenario, the present invention generally relates to a method for transmitting service and/or device discovery messages in a wireless communication network which provides routing, packet forwarding as well as service and/or device discovery functionality, wherein said method comprises a step of preventing broadcast routing and packet forwarding of data packets carrying service and/or device discovery messages as payloads within said wireless communication network. In this communication scenario, said service and/or device discovery messages may be transmitted by using a communication protocol of a protocol layer organized on top of a TCP/IP-based networking layer from a protocol stack hierarchy according to the ISO/OSI reference model, wherein said communication protocol is based on the UPnP standard. The routing, packet forwarding and service and/or device discovery functionality in said wireless communication network may preferably be provided on a medium access control (MAC) sublayer of the data link control (DLC) layer from said protocol stack hierarchy. In particular, said step of preventing broadcast routing and packet forwarding of data packets carrying service and/or device discovery messages as payloads within said wireless communication network may be realized as a step of preventing broadcast routing and packet forwarding of DLC/MAC data packets carrying IP data packets as payloads which, in turn, contain data packets of the UPnP service and/or device discovery messages as payloads within the above-mentioned wireless communication network.

After having received a request for performing a UPnP service and/or device search within said wireless communication network from a first UPnP-enabled wireless node being connected to the wireless communication network, a service and/or device search procedure is carried out which searches for other UPnP-enabled nodes matching the request by sending data packets of a broadcast message on the MAC sublayer from the network protocol stack of said first UPnP-enabled wireless node's host operating system, the broadcast message carrying an IP payload that, in turn, comprises a UPnP service and/or device discovery message as a payload, to other wireless nodes within the wireless communication network. Said broadcast message is then forwarded through the wireless communication network, and responses from the other wireless nodes are received on said MAC sublayer. Thereafter, UPnP multicast messages to be sent from said first UPnP-enabled wireless node to other UPnP-enabled wireless nodes found by said service and/or device search procedure are intercepted in the network protocol stack below the IP layer of first UPnP-enabled wireless node's host operating system. Said UPnP multicast messages are mapped to DLC/MAC unicast messages, said DLC/MAC unicast messages carrying an IP payload which, in turn, contains a UPnP service and/or device discovery message as a payload, and, finally, these DLC/MAC unicast messages are sent to those other UPnP-enabled wireless nodes within said wireless communication network they are destined.

According to a further aspect of this embodiment, DLC wake-up messages are sent to each other UPnP-enabled wireless node for ensuring that the host operating systems of these UPnP-enabled wireless nodes are capable of forwarding a received DLC/MAC unicast message to higher layers of their network protocol stack before executing said step of sending a DLC/MAC unicast message to each of these other UPnP-enabled wireless nodes.

According to a still further aspect of this embodiment, each duplicate of a periodically repeated IP multicast service and/or device announcement message to be sent from UPnP-enabled wireless nodes to other wireless nodes within said wireless communication network is partly or completely intercepted and dropped.

A further aspect of this embodiment refers to the steps of mapping at least one UPnP device and/or service type to the closest-matching device type of other UPnP-enabled wireless nodes within said wireless communication network and ignoring not UPnP-enabled devices.

According to a still further aspect of this embodiment, said UPnP multicast messages are buffered until at least one other UPnP-enabled wireless node has been found by said service and/or device search procedure in the network protocol stack below the IP layer of said wireless node's host operating system. These buffered UPnP multicast messages are deleted when a confirmation message indicating that said at least one other UPnP-enabled wireless node matching said request has been found.

A further aspect of the present invention generally refers to a wireless node for transmitting service and/or device discovery messages in a wireless communication network which provides routing, packet forwarding and service and/or device discovery functionality, wherein said wireless node comprises a module being specially configured for preventing broadcast routing and packet forwarding of data packets carrying service and/or device discovery messages as payloads within said wireless communication network. Said wireless node may be specially configured for transmitting these service and/or device discovery messages by using a communication protocol of a protocol layer organized on top of a TCP/IP-based networking layer from a protocol stack hierarchy according to the ISO/OSI reference model, wherein said communication protocol is based on the Universal Plug and Play (UPnP) standard. The routing, packet forwarding as well as service and/or device discovery functionality in said wireless communication network may preferably be provided on a medium access control (MAC) sublayer of the data link control (DLC) layer from said protocol stack hierarchy. In particular, said module may be specially configured for preventing broadcast routing and packet forwarding of DLC/MAC data packets carrying IP data packets as payloads which, in turn, contain data packets of the UPnP service and/or device discovery messages as payloads within said wireless communication network.

According to a further aspect of this embodiment, the aforementioned module is specially configured for performing a method as described above.

The module especially comprises a profile mapping unit being specially configured for mapping at least one UPnP device and/or service type to the closest-matching device type of other UPnP-enabled wireless nodes within said wireless communication network, thereby ignoring not UPnP-enabled devices.

Finally, a third embodiment of this invention pertains to a computer program product being specially configured for performing a method as described above.

BRIEF DESCRIPTION OF THE DRAWINGS

Advantageous features, aspects, and advantages of the invention will become evident from the following description, the appended claims, and the accompanying drawings. Thereby.

DETAILED DESCRIPTION OF THE PRESENT INVENTION

In the following, the invention will be explained in more detail with respect to special embodiments and in relation to the accompanying drawings.

Figure 1:
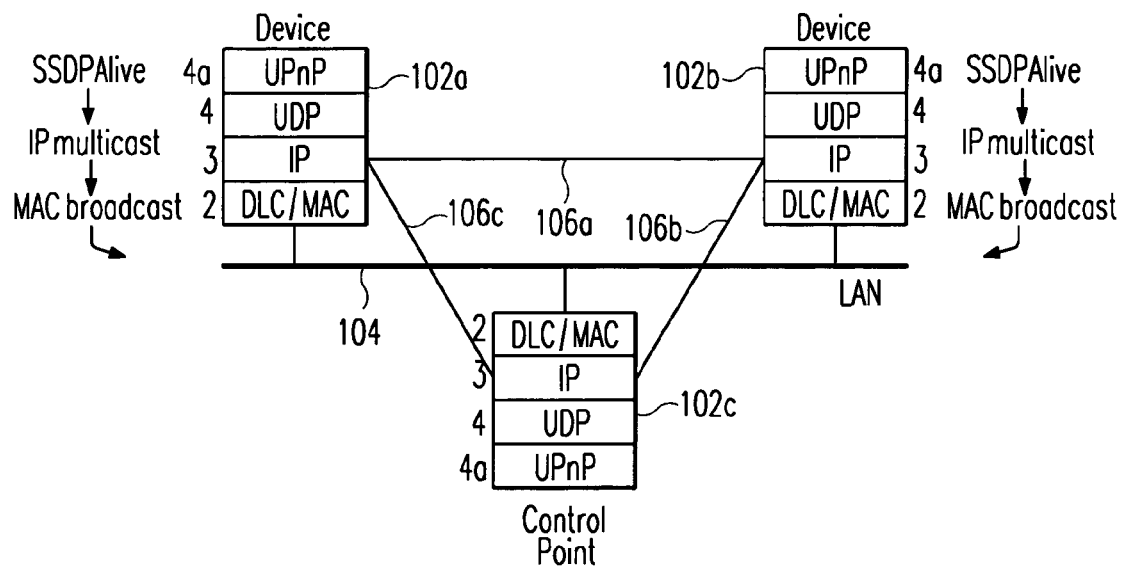
FIG. 1 shows a communication scenario between two CDs and a CP in a fixed line network realized as a wired LAN with bus topology and the network protocol stacks of these nodes, wherein said fixed line network is based on a UPnP-based communication protocol on top of a TCP/IP-based networking layer.
Figure 2:
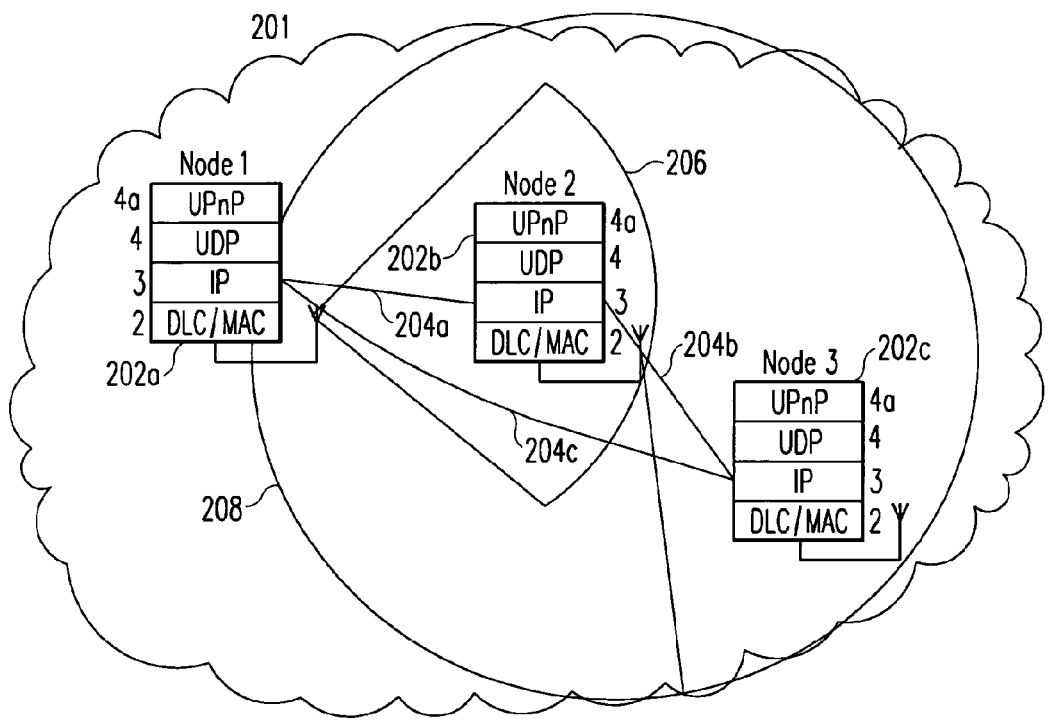
FIG. 2 shows a further communication scenario in a wireless network with three UPnP-enabled nodes.
Figure 3:
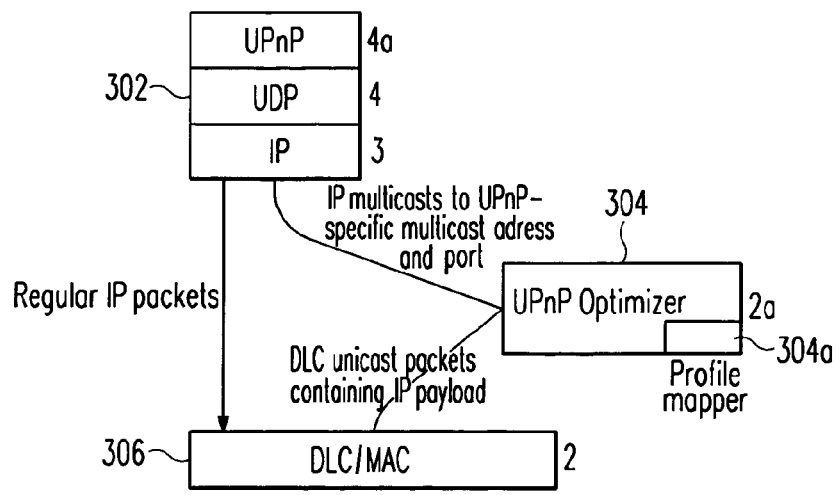
FIG. 3 is a diagram showing a network protocol stack of a wireless node's host operating system, said network protocol stack being extended by an UPnP optimizer module according to the present invention which is integrated between the DLC layer and the IP layer of said network protocol stack.
Figure 4:
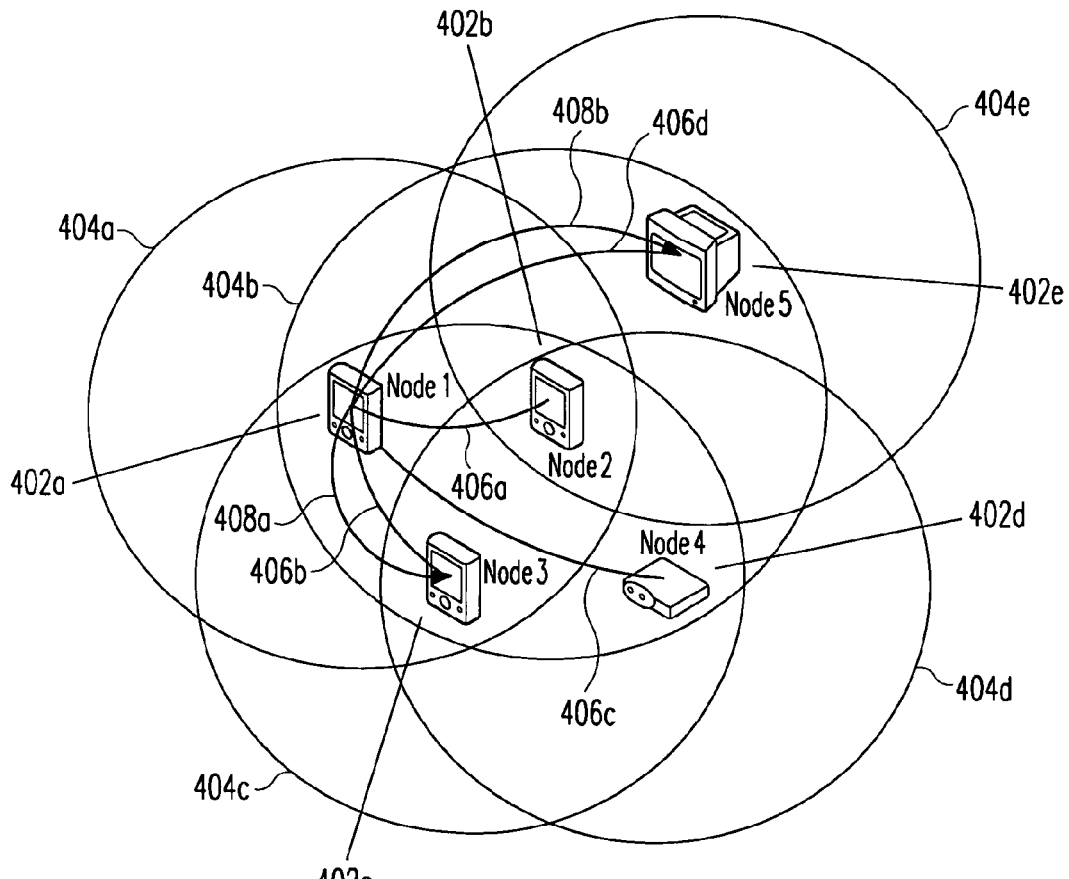
FIG. 4 shows a wireless communication scenario with an optimized distribution of UPnP multicast messages according to the present invention.

An example for the proposed method according to the present invention is illustrated in the wireless network scenario depicted FIG. 4. Therein, nodes 1, 3 and 5, in FIG. 4 also referred to by reference numbers 402a, 402c and 402e, respectively, are UPnP-enabled, while nodes 2 and 4, in FIG. 4 also referred to by reference numbers 402b and 402d, respectively, only support the wireless network specific device discovery functionality. If node 1 now wants to perform a UPnP device search by sending a multicast packet, the UPnP optimizer module 304 according to the present invention performs a service and/or device discovery for UPnP-enabled devices by using specific functions on the MAC sublayer of the DLC layer. This discovery process will find nodes 3 and 5. (Thereby, node 5 is found since the DLC/MAC discovery message is forwarded by node 2.) This message exchange is represented by lines 406a-d. Arrows 408a and 408b represent two subsequent DLC/MAC unicast messages carrying the IP payload (which, in turn, contains a UPnP service and/or device discovery message). Since the host PC of a wireless network card may be in sleep mode while the network card itself is still capable of performing DLC layer communication, the UPnP optimizer module 304 according to the present invention sends a special DLC wake-up message so as to ensure that the receiving PC is woken up and capable of forwarding the message to the higher layers (IP, UPnP) on the host PC before sending the unicast message. Said UPnP devices periodically send out notification messages ("alive" messages) to make themselves known to other nodes on the wireless network, which are repeated two or three times when following the standard recommendation. The UPnP optimizer module 304 according to the present invention can be configured to modify this behavior in order to intercept these device announcements and drop all of them before they are sent or to only drop said duplicate messages if the wireless network is considered to be reliable enough.

In contrast to a standard UPnP implementation without any UPnP optimizer module, which is not optimized for use in a wireless network, the UPnP optimizer module according to the present invention component reduces the amount of communication overhead incurred through UPnP device searches and announcements

- by intercepting device announcements partly or completely and
- by using unicast messages instead of layer 2 broadcast messages to send device enquiries only to those wireless network nodes which support UPnP and are possible candidates because of a matching wireless network device type.

The proposed UPnP optimizer module 304 according to the present invention can be used with any UPnP implementation, regardless whether the source code of that implementation is available or not, as said UPnP implementation does not need to be modified. Even though the UPnP standard behavior is slightly modified, the UPnP optimizer module 304 as described above does not break the overall UPnP semantics. If the modifications would cause problems, it can be configured easily to be more (or completely) adherent to the UPnP standard (which means losing efficiency). The timing diagram depicted in FIG. 5 shows a (simplified) message exchange of a device announcement without the above-described optimization procedure.

Figure 5:
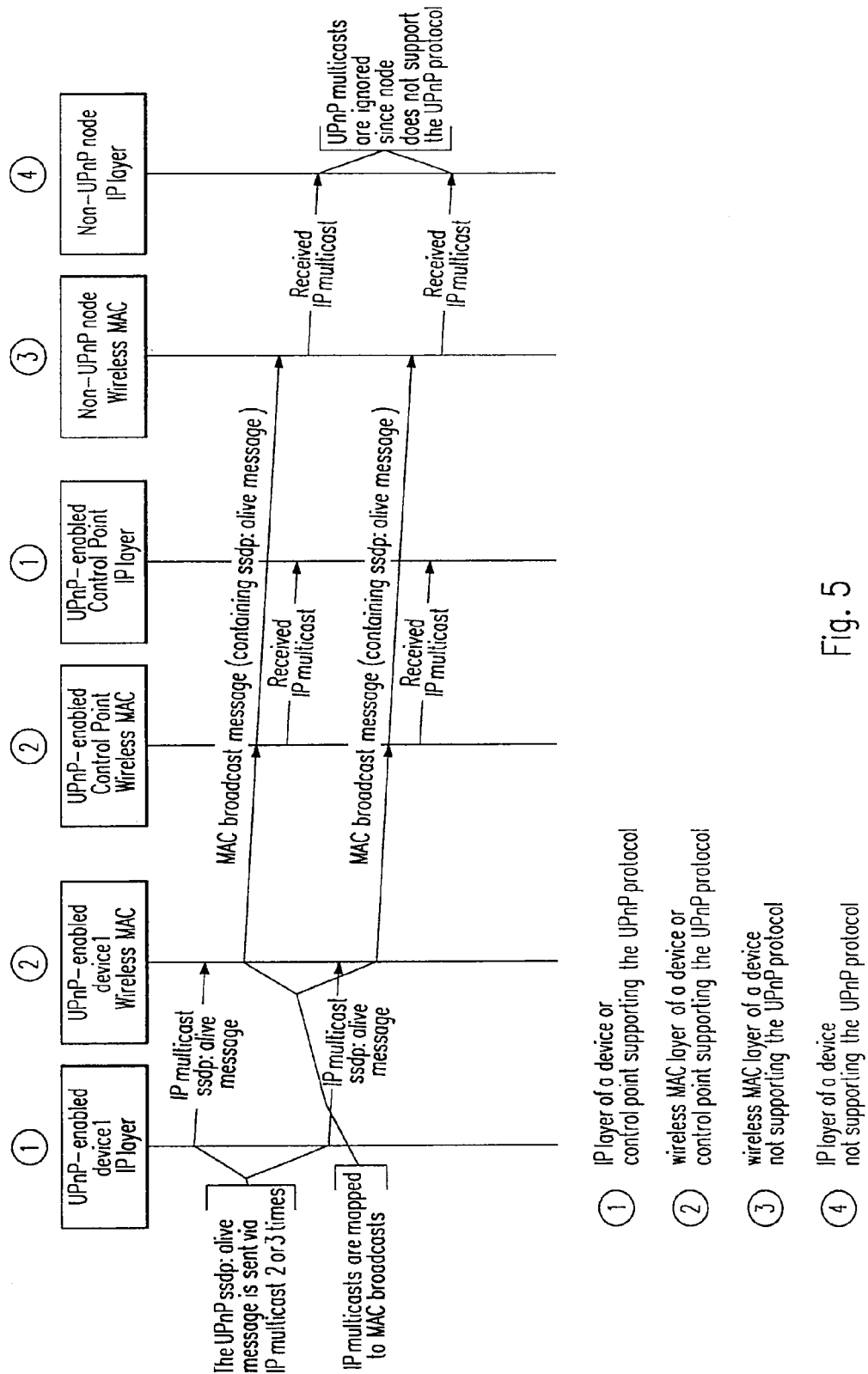
FIG. 5 shows a timing diagram for illustrating message exchange between protocol layers of UPnP-enabled wireless nodes and not UPnP-enabled wireless nodes in a wireless communication system, wherein the UPnP optimizer module according to the present invention is not applied.
Figure 6:
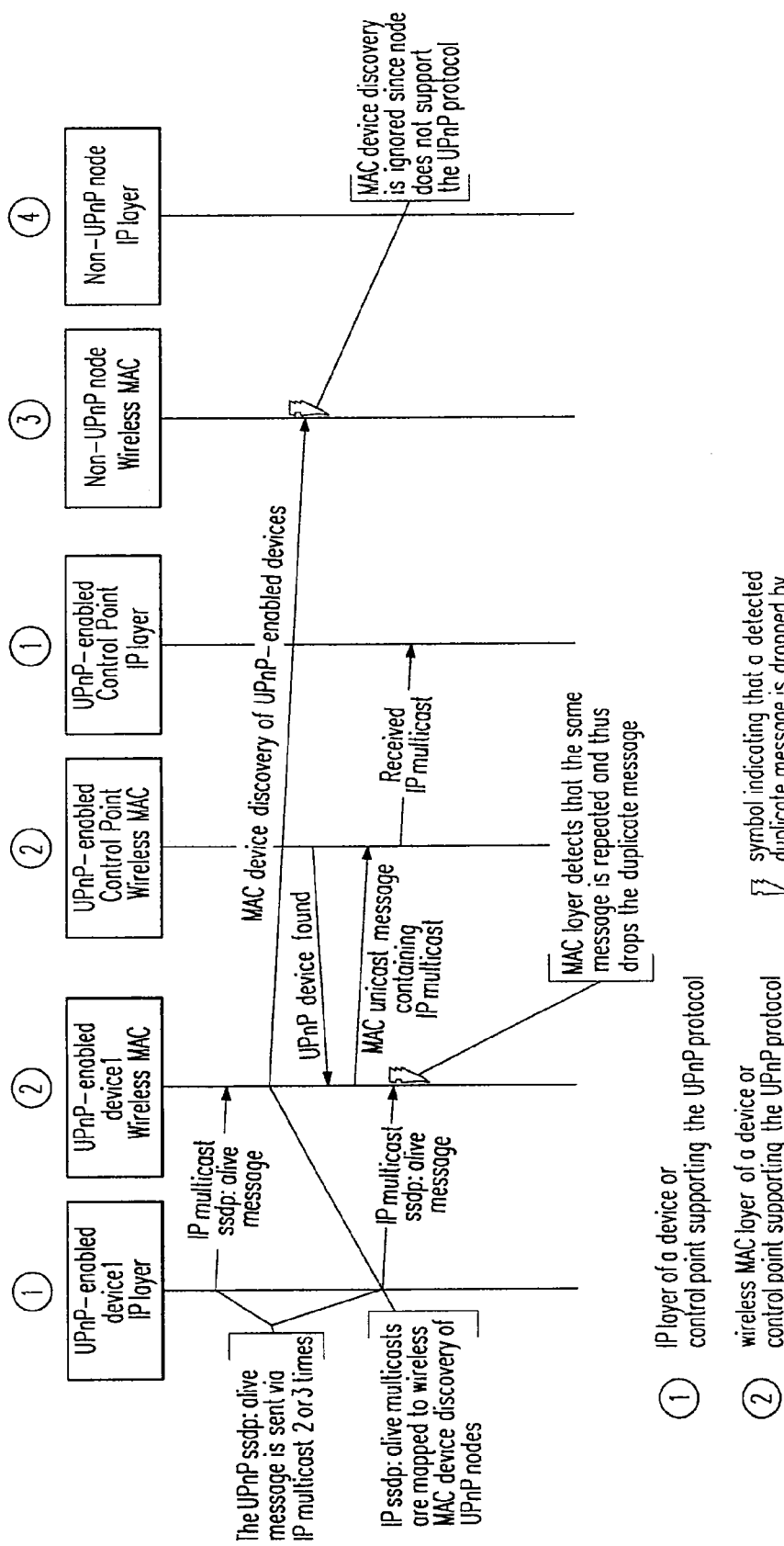
FIG. 6 shows a timing diagram for illustrating message exchange between protocol layers of UPnP-enabled wireless nodes and not UPnP-enabled wireless nodes in a wireless communication system, wherein the UPnP optimizer module according to the present invention is applied.

As opposed to FIG. 5, the timing diagram depicted in FIG. 6 shows the interactions for a message exchange when the UPnP optimizer module 304 according to the present invention is used.

As can be seen from the timing diagrams depicted in FIGS. 5 and 6, the proposed UPnP optimizer module 304 according to the present invention decreases the amount of broadcasted packets when a UPnP-enabled device announces its presence on the wireless network. Utilizing wireless MAC specific device discovery features that are more efficient than IP-based device discovery, the proposed UPnP optimizer module 304 according to the present invention only sends UPnP messages to UPnP-enabled devices. Moreover, as the UPnP standard recommends to repeat messages once or twice, these duplicate messages are intercepted and removed so as to avoid this overhead.

Figure 7A:
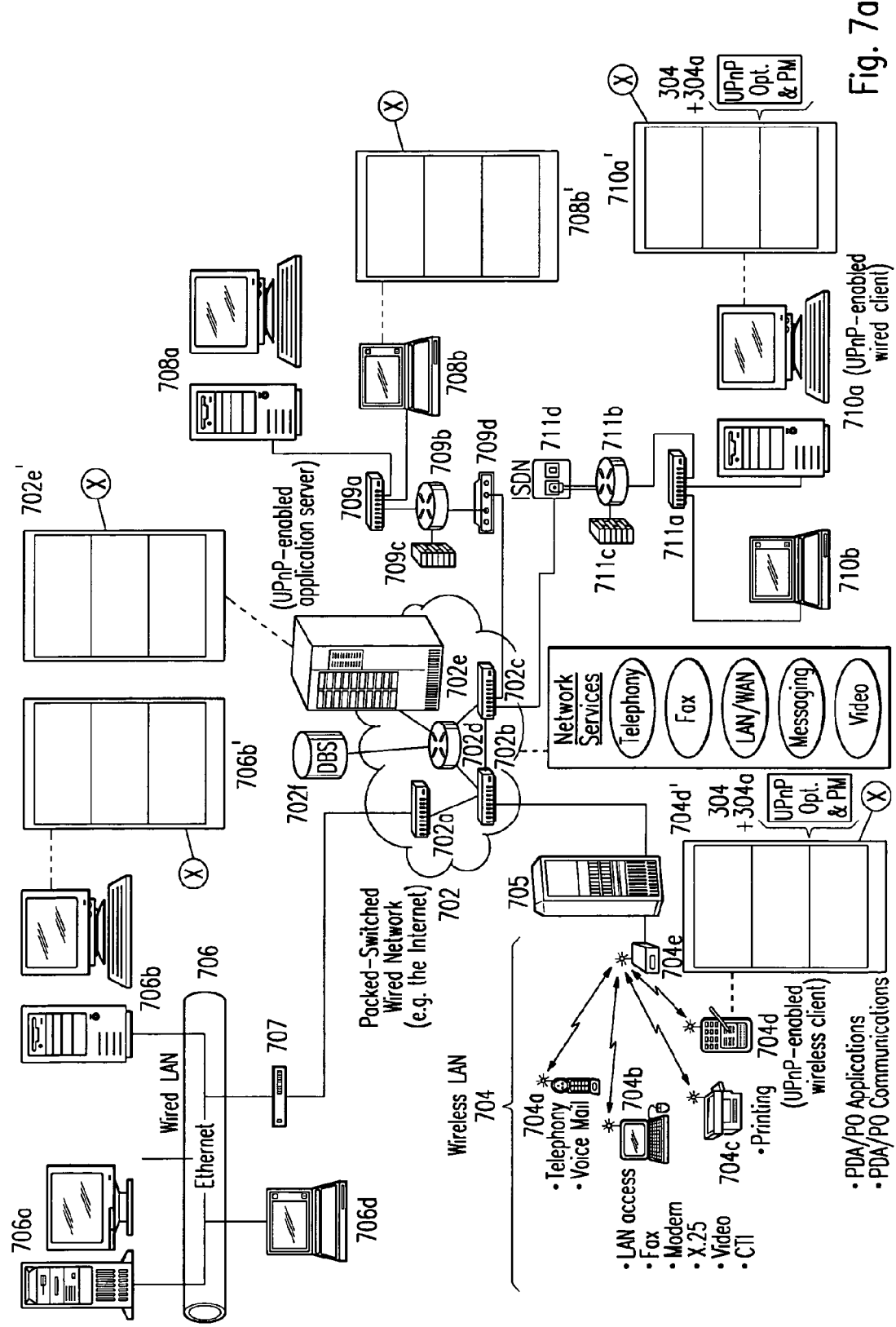
FIG. 7a shows a communication scenario in a client/server-based heterogeneous network environment, wherein a UPnP-enabled wireless client equipped with the proposed UPnP optimizer module according to the present invention is communicating with a UPnP-enabled application server which has been found by a service and device discovery procedure initiated by the wireless client.

In FIG. 7a a typical communication scenario in a client/server-based heterogeneous network environment is shown, wherein a UPnP-enabled wireless client 704d, e.g. a Web-enabled organizer or a Personal Digital Assistant (PDA), equipped with the proposed UPnP optimizer module 304 according to the present invention is communicating with a UPnP-enabled application server 702e which has been found by a service and device discovery procedure initiated by said wireless client 704d. As can be taken from FIG. 7a, data packets carrying a service and/or device discovery request message as a payload to be sent from UPnP-enabled wireless client 704d to the aforementioned UPnP-enabled application server 702e are wirelessly transmitted from the UPnP-enabled wireless client 704d to an access point 704e acting as a base station of a wireless LAN said wireless client 704d is a part of, before they are further transferred via gateway 705 from said access point 704e over a wired link to a packet-switched wired network 702 (e.g. the Internet), wherein they are forwarded and routed via hub 702b and at least one node 702d with routing functionality, respectively, to the aforementioned UPnP-enabled application server 702e so as to have access to a specific network service offered by this application server, such as e.g. Voice-over-IP (VoIP), fax and e-mail messaging, LAN/WAN access, video-on-demand, etc., or to have access to a data base system of a file server 702f, which is connected to the UPnP-enabled application server 702e via node 702d. In the communication scenario depicted in FIG. 7a, further examples of UPnP-enabled and not UPnP-enabled clients sending requests for receiving service and/or device discovery information are shown. These examples include a UPnP-enabled personal computer 710a and a not UPnP-enabled laptop computer 710b being connected to the packet-switched wired network 702 via an ISDN link by switch 711a, node 711b/c with router and firewall capability and ISDN socket 711d, a not UPnP-enabled personal computer 708a and a further not UPnP-enabled laptop computer 708b being connected to the packet-switched wired network 702 via a modem link by switch 709a, node 709b/c with router and firewall capability and modem 709d as well as a wired Ethernet LAN 706 with bus topology being connected to the packet-switched wired network 702 by means of bridge router (brouter) 707, wherein said Ethernet LAN 706 is used for connecting a number of wired clients comprising e.g. a workstation computer 706a, a personal computer 706b and a laptop computer 706d of a small company's corporate network. From FIG. 7a it is apparent that both UPnP-enabled and not UPnP-enabled nodes within this client-server-based heterogeneous network environment communicate with each other via said network links by using identical protocol stacks 704d', 706b', 702e' and 710a' (the details of which are shown in FIG. 7d) with a protocol stack hierarchy organized according to the ISO/OSI reference model. This means that identical communication protocols are used in the corresponding protocol layers of each node. In UPnP-enabled nodes 704d and 710a, however, service and/or device discovery messages are transmitted by using an additional communication protocol of a protocol layer organized on top of a TCP/IP-based networking layer from a protocol stack hierarchy according to the ISO/OSI reference model, wherein said communication protocol is based on the UPnP standard. According to the present invention, these nodes can advantageously be equipped with the proposed UPnP optimizer module 304 described above as depicted in FIG. 7a.

Figure 7B:
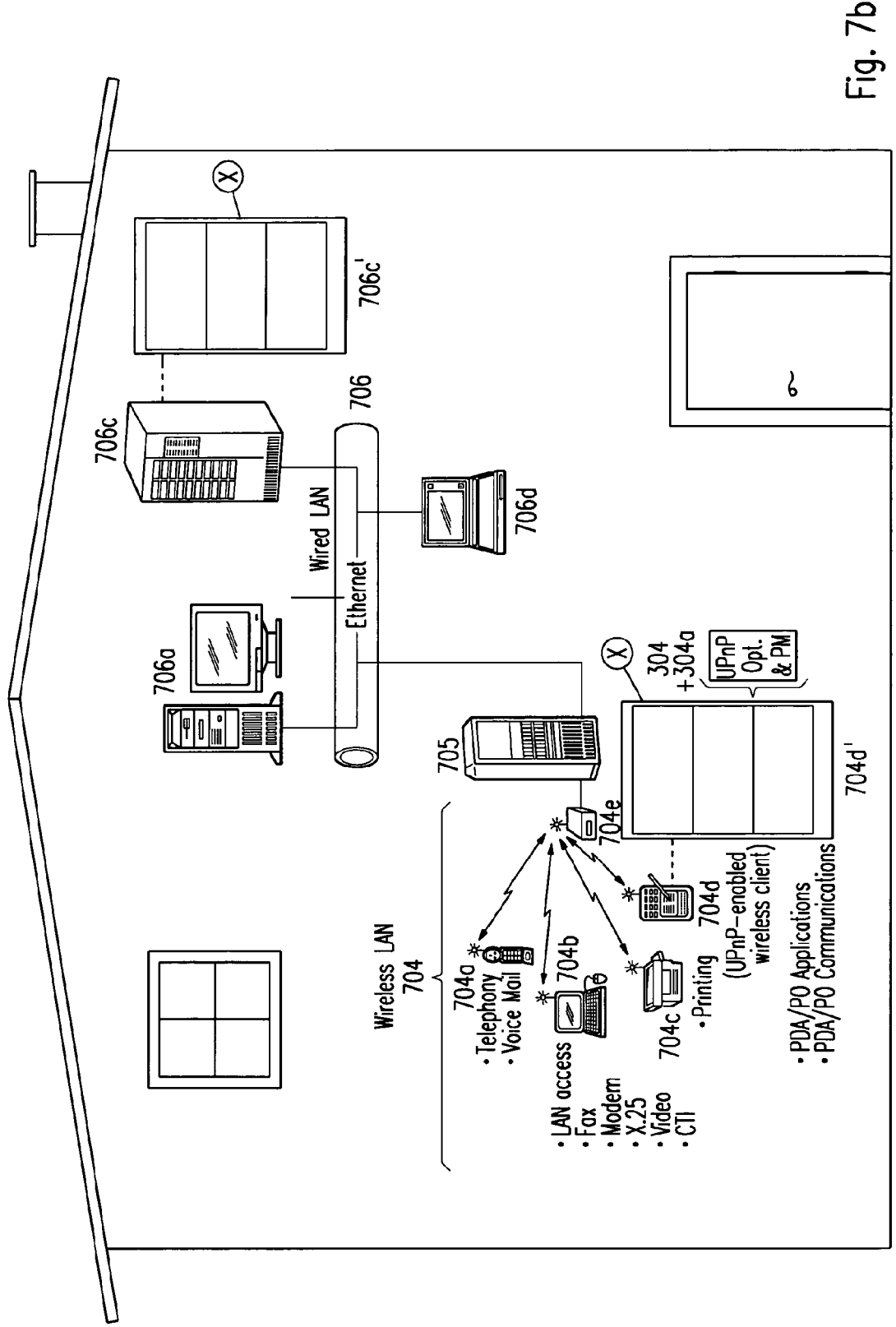
FIG. 7b shows a communication scenario in a client/server-based heterogeneous home network environment consisting of a wireless LAN and a backbone network realized as a wired LAN, wherein a UPnP-enabled wireless client equipped with the UPnP optimizer module is communicating with a home server that has been found by a service and device discovery procedure initiated by the wireless client.

In FIG. 7b a typical communication scenario in a client/server-based heterogeneous home network environment consisting of a wireless LAN 704 as described with reference to FIG. 7a and a backbone network realized as a wired Ethernet LAN 706 with bus topology which is connected to the wireless LAN 704 by means of a gateway 705 is shown. Thereby, said Ethernet LAN 706 is used for connecting a number of wired clients comprising e.g. a workstation computer 706a and a laptop computer 706d (herein also referred to as "media renderer devices") with a UPnP-enabled application server 706c (also referred to as "media server" or "home server") in said home network environment. In this communication scenario, a UPnP-enabled wireless client 704d (e.g. a Web-enabled organizer or PDA) equipped with the proposed UPnP optimizer module 304 according to the present invention is communicating with said home server 706c, wherein the latter has been found by a service and device discovery procedure initiated by the wireless client 704d. From FIG. 7b it can be taken that both UPnP-enabled and not UPnP-enabled nodes within this client-server-based heterogeneous home network environment communicate with each other by using identical protocol stacks 704d' and 706c' having a protocol stack hierarchy which is organized according to the ISO/OSI reference model. In UPnP-enabled wireless nodes 704d and 706c, service and/or device discovery messages are transmitted by using an additional communication protocol from a protocol layer organized on top of a TCP/IP-based networking layer from a protocol stack hierarchy according to the ISO/OSI reference model, wherein said communication protocol is based on the UPnP standard. According to the present invention, the UPnP optimizer module 304 can optionally be switched off in order to avoid unnecessary processing overhead. In case a node (not shown) within the above-described client/server-based heterogeneous home network environment is connected both to the wireless LAN 704 and to the wired Ethernet LAN 706, said UPnP optimizer module 304 may be configured for being active only on the wireless interface.

Figure 7C:
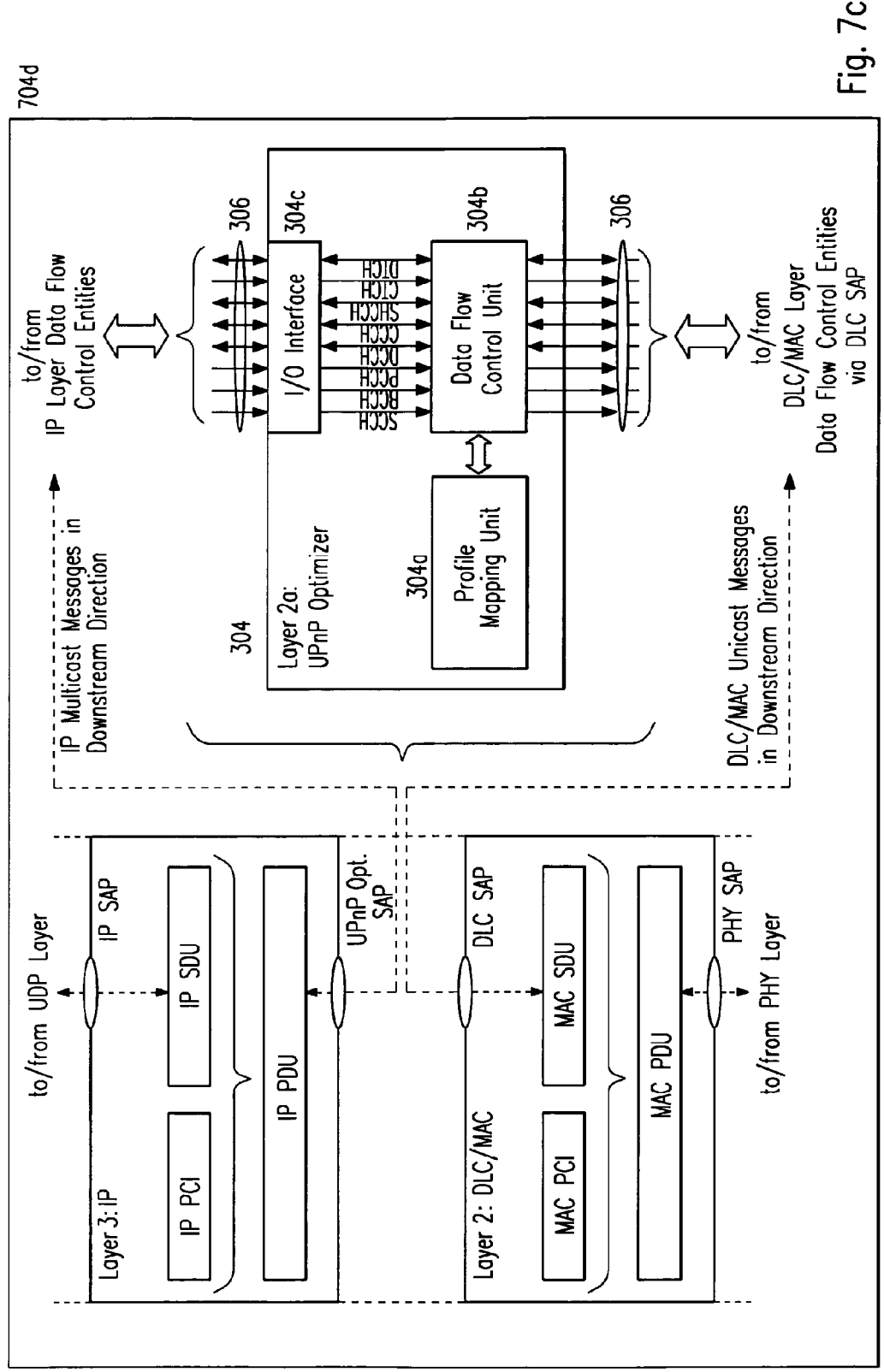
FIG. 7c shows a part of the protocol stack hierarchy used by this wireless node.
Figure 7D:
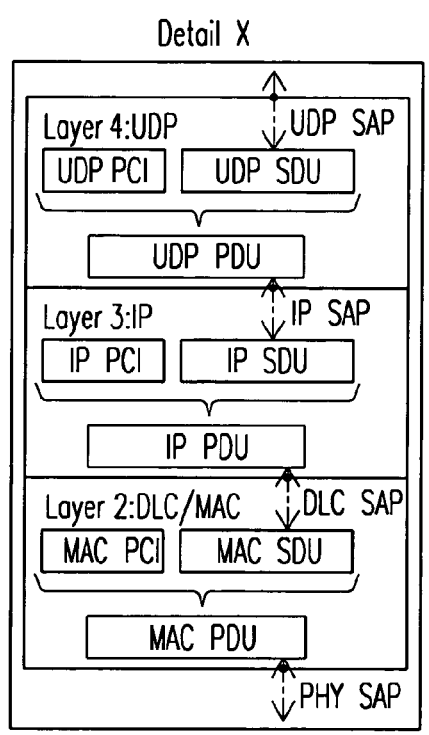
FIG. 7d shows the details of identical protocol stacks $704d'$, $706b'$, $702e'$ and $710a'$ shown in FIG. 7a and FIG. 8 shows a flow chart which illustrates the proposed method for transmitting service and/or device discovery messages according to the present invention.

FIG. 7c shows the data transfer between the IP layer and the MAC sublayer of the DLC layer from a protocol stack hierarchy used by a UPnP-enabled wireless client 704d which is advantageously equipped with the proposed UPnP optimizer module 304 according to the present invention. Said proposed UPnP optimizer module is thereby integrated within this protocol stack as a new sublayer 2a between the IP layer and the MAC sublayer of the DLC layer. An IP protocol data unit (IP PDU) which consists of a data packet comprising a header, referred to as IP protocol control information (IP PCI), followed by an IP service data unit (IP SDU) that is used for carrying UDP data packets as payloads is transferred via a new service access point (in the following referred to as "UPnP Opt. SAP") on logical traffic channels such as the Common Traffic Channel (CTCH) and the Dedicated Traffic Channel (DTCH) and/or on logical control channels such as the Synchronization Control Channel (SCCH), the Broadcast Control Channel (BCCH), the Paging Control Channel (PCCH) and the Dedicated Control Channel (DCCH) as well as the Common Control Channel (CCCH) and the Shared Channel Control Channel (SHCCH) to an input/output (I/O) interface 304c of the proposed UPnP optimizer module 304 and forwarded to an integrated data flow control unit 304b.

According to the invention, this data flow control unit 304b is responsible for preventing broadcast routing and packet forwarding of MAC PDUs carrying IP PDUs as payloads which, in turn, contain PDUs of a UPnP service and/or device discovery message from said UPnP-enabled wireless node 704d as payloads. Moreover, a profile mapping unit 304a connected to the data flow control unit 304b, said profile mapping unit 304a allowing a relative fine-grained mapping of UPnP-enabled network devices searched by a UPnP query to the respective wireless network device type of the UPnP-enabled wireless client (here: PDA 704d) being equipped with said UPnP optimizer module 304, can be integrated within the UPnP optimizer module 304. After having intercepted a UPnP multicast message to be sent from UPnP-enabled wireless client 704d to other UPnP-enabled nodes 702e and 710a within said client/server-based heterogeneous communication network which have been found by a service and/or device search procedure initiated by the UPnP-enabled wireless client 704d, data flow control unit 304b maps this UPnP multicast message to a DLC/MAC unicast message to be sent to the UPnP-enabled application server 702e it is destined. Thereby, said DLC/MAC unicast message carries an IP payload which, in turn, contains a UPnP service and/or device discovery message as a payload. FIG. 7c further illustrates that a new IP PDU which contains the aforementioned DLC/MAC unicast message is transferred via a DLC service access point (DLC SAP) to a data flow control entity (not shown) in the MAC sublayer of the DLC layer. After that, a MAC protocol data unit (MAC PDU) that consists of a data packet comprising a header, which is also referred to as MAC protocol control information (MAC PCI), followed by a MAC service data unit (MAC SDU) which is used for carrying IP PDUs as payloads is transferred via a PHY service access point (PHY SAP) to the physical layer in order to be sent to said UPnP-enabled application server 702e.

Figure 8:
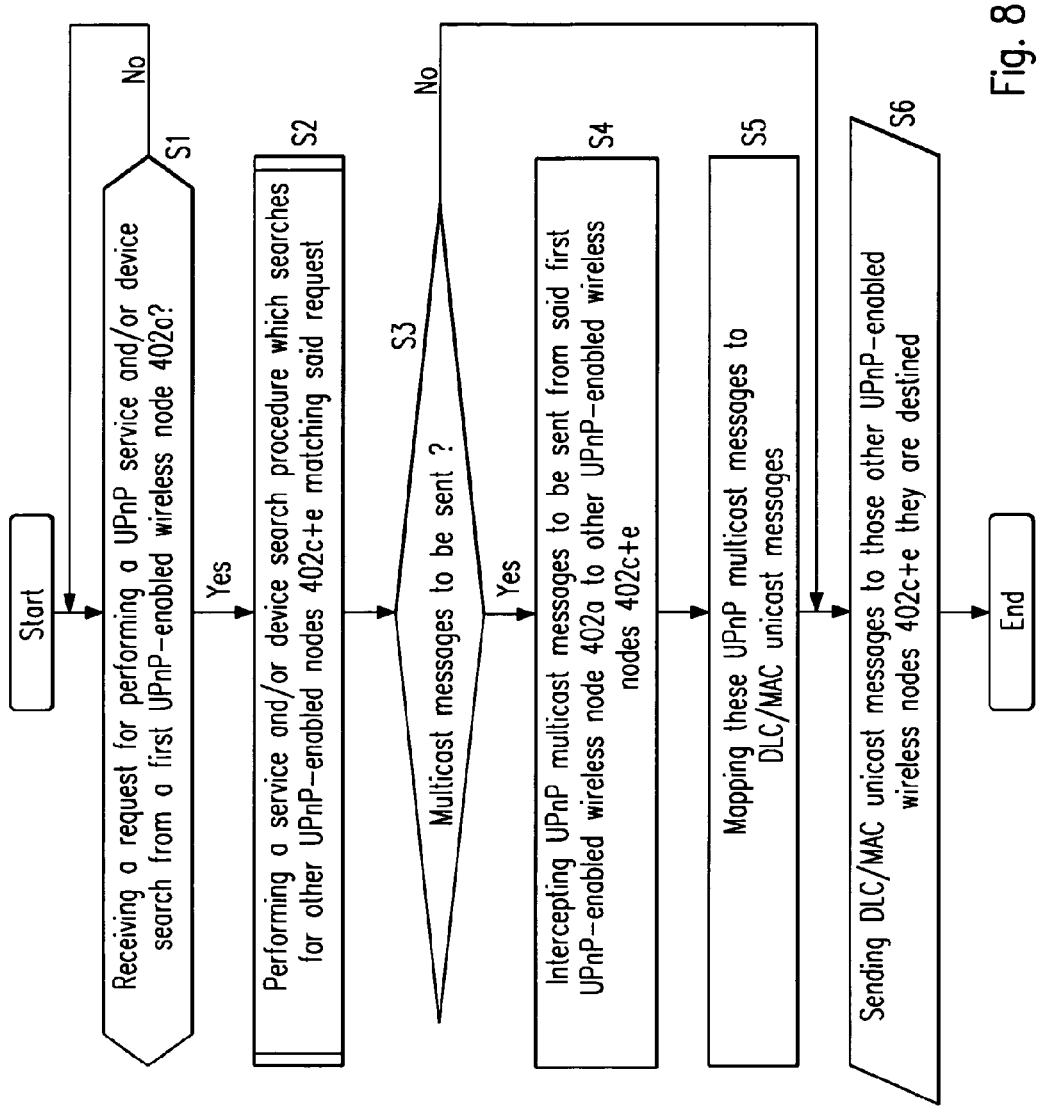

A flow chart that illustrates the proposed method for transmitting service and/or device discovery messages according to the present invention is shown in FIG. 8. The procedure described by this flow chart begins with a step of waiting for the reception of a request (S1) for performing a UPnP service and/or device search within said wireless communication network from a first UPnP-enabled wireless node 402a being connected to the wireless communication network. In case such a request is not received, the procedure returns to its start, thus waiting until a request for performing a UPnP service and/or device search has been received. After having received such a request, a service and/or device search procedure (S2) is carried out that searches for other UPnP-enabled nodes 402c and 402e matching said request by sending PDUs of a multicast message on the MAC sublayer of the DLC layer from the protocol stack of the first UPnP-enabled wireless node's host operating system, said multicast message carrying an IP payload which, in turn, contains a UPnP service and/or device discovery message as a payload, to other nodes 402b, 402c, 402d and 402e in the wireless communication network, forwarding the multicast message through said wireless communication network and receiving responses from said other wireless nodes 402b-e on said MAC sublayer. In case of receiving a control signal (S3) which commands to send UPnP multicast messages from the first UPnP-enabled wireless node 402a to other UPnP-enabled wireless nodes 402c+e found by said service and/or device search procedure, the UPnP multicast messages are intercepted (S4) in the protocol stack below the IP layer of said first UPnP-enabled wireless node's host operating system and then mapped (S5) to a specific number of DLC/MAC unicast messages carrying an IP payload which, in turn, contains a UPnP service and/or device discovery message as a payload. The DLC/MAC unicast messages are finally sent (S6) to those other UPnP-enabled wireless nodes 402c+e within the wireless communication network they are destined. In case such a control signal is not received, the procedure is continued with step S6.

In contrast to the above-described prior art, the proposed UPnP optimizer module 304 according to the present invention does not need any interworking unit to intercept UPnP data packets. Instead, each UPnP-enabled wireless node 402a, 402c and 402e is able to perform the above-described method for transmitting UPnP service and/or device discovery messages, such that it is more flexible. Furthermore, the proposed UPnP optimizer module 304 according to the present invention is not limited to the setup described in prior-art document WO 2005/076567 A1, which refers to a combination of a wired and wireless network, but works well in a pure wireless network environment.

A further difference between prior-art document WO 2005/076567 A1 and the present invention consists in the fact that according to the present invention UPnP multicast packets are not just dropped to prevent overloading the wireless network. Instead, capabilities of the underlying wireless network are used to perform an optimized device search for UPnP-enabled devices within said wireless communication network. If UPnP-enabled devices are found, said UPnP optimizer module 304 sends UPnP unicast messages to all those UPnP-enabled wireless nodes they are destined.

The invention claimed is:

1. A method for transmitting service and/or device discovery messages by a first node to other nodes in a wireless communication network that provides routing, packet forwarding, and service and/or device discovery functionality in a MAC-sublayer of a DLC-layer not supporting multicast routing, by using a communication protocol of a protocol layer organized on top of a TCP/IP-based networking layer from a protocol stack hierarchy according to the ISO/OSI reference model, wherein the communication protocol is based on the Universal Plug and Play (UPnP) standard, the method comprising:
preventing the first node from broadcast routing and packet forwarding of data packets carrying service and/or device discovery messages as payloads within the wireless communication network by intercepting the first node from sending UPnP multicast messages to be sent from a first UPnP-enabled wireless node to other UPnP-enabled wireless nodes found by a service and/or device search procedure in a network protocol stack below an IP layer of said first UPnP-enabled wireless node's host operating system;
mapping the UPnP multicast messages by an optimizer module of the first node to DLC/MAC unicast messages, said DLC/MAC unicast messages carrying an IP payload which, in turn, contains a UPnP service and/or device discovery message as a payload;
sending the DLC/MAC unicast messages to said other UPnP-enabled wireless nodes within said wireless communication network to which the DLC/MAC unicast messages are destined;
buffering the UPnP multicast messages until at least one other UPnP-enabled wireless node has been found by the service and/or device search procedure in the network protocol stack below the IP layer of the first UPnP-enabled wireless node's host operating system; and
deleting buffered UPnP multicast messages when a confirmation message indicating that the at least one other UPnP-enabled wireless node matching the request has been found.

2. A method according to claim 1, wherein
the preventing broadcast routing and packet forwarding of data packets carrying service and/or device discovery messages as payloads within the wireless communication network includes preventing broadcast routing and packet forwarding of DLC/MAC data packets carrying IP data packets as payloads which, in turn, contain data packets of the UPnP service and/or device discovery messages as payloads within the wireless communication network.

3. A method according to claim 2, further comprising:
receiving a request for performing a UPnP service and/or device search within the wireless communication network from a first UPnP-enabled wireless node being connected to the wireless communication network; and
performing a service and/or device search procedure that searches for other UPnP-enabled nodes matching the request by sending data packets of a broadcast message on the medium access control (MAC) sublayer of the data link control (DLC) layer from the network protocol stack of the first UPnP-enabled wireless node's host operating system, the broadcast message carrying an IP payload which, in turn, includes a UPnP service and/or device discovery message as a payload, to other wireless nodes within the wireless communication network, forwarding the broadcast message through the wireless communication network and receiving responses from the other wireless nodes on the medium access control sublayer.

4. A method according to claim 2, further comprising:
sending DLC wake-up messages to each other UPnP-enabled wireless node for ensuring that the host operating systems of the UPnP-enabled wireless nodes are capable of forwarding a received DLC/MAC unicast message to higher layers of their network protocol stack before sending a DLC/MAC unicast message to each of the other UPnP-enabled wireless nodes.

5. A method according to claim 2, further comprising:
partly or completely intercepting and dropping each duplicate of a periodically repeated IP multicast service and/or device announcement message to be sent from UPnP-enabled wireless nodes to other wireless nodes within the wireless communication network.

6. A method according to claim 2, further comprising:
mapping at least one UPnP device and/or service type to a closest-matching device type of other UPnP-enabled wireless nodes within the wireless communication network; and
ignoring not UPnP-enabled devices.

7. A method according to claim 2, further comprising:
mapping at least one UPnP device and/or service type to the closest-matching device type of other UPnP-enabled wireless nodes within said wireless communication network; and
ignoring not UPnP-enabled devices.

8. A wireless node for transmitting service and/or device discovery messages in a wireless communication network that provides routing, packet forwarding as well as service and/or device discovery functionality in a MAC-sublayer of a DLC-layer by using a communication protocol of a protocol layer organized on top of a TCP/IP-based networking layer from a protocol stack hierarchy according to the ISO/OSI reference model, wherein the communication protocol is based on the Universal Plug and Play (UPnP) standard, comprising:

a module configured to prevent broadcast routing and packet forwarding of data packets carrying service and/or device discovery messages as payloads within the wireless communication network by intercepting UPnP multicast messages to be sent from a first UPnP-enabled wireless node to other UPnP-enabled wireless nodes found by a service an/or device search procedure in a network protocol stack below an IP layer of said first UPnP-enabled wireless node's host operating system;

map the UPnP multicast messages to DLC/MAC unicast messages, said DLC/MAC unicast messages carrying an IP payload which, in turn, contains a UPnP service and/or device discovery message as a payload;

send the DLC/MAC unicast messages to said other UPnP-enabled wireless nodes within said wireless communication network to which the DLC/MAC unicast messages are destined;

buffer said UPnP multicast messages until at least one of said other UPnP-enabled wireless nodes has been found by said service and/or device search procedure in the network protocol stack below the IP layer of said first UPnP-enabled wireless node's host operating system; and delete buffered UPnP multicast messages when a confirmation message indicating that said at least one of said other UPnP-enabled wireless nodes matching said request has been found.

9. A wireless node according to claim 8, wherein the module is further configured to prevent broadcast routing and packet forwarding of DLC/MAC data packets carrying IP data packets as payloads which, in turn, contain data packets of the UPnP service and/or device discovery messages as payloads within the wireless communication network.

10. A wireless node according to claim 8, further comprising a profile mapping unit configured to map the multicast messages.

11. A wireless node according to claim 8, wherein said module is configured for preventing broadcast routing and packet forwarding of DLC/MAC data packets carrying IP data packets as payloads which, in turn, contain data packets of said UPnP service and/or device discovery messages as payloads within said wireless communication network.

* * * * *